United States Patent [19]

Suzuki et al.

[11] Patent Number: 4,811,126

[45] Date of Patent: Mar. 7, 1989

[54] RECORDING/REPRODUCING SYSTEM FOR A MAGNETIC RECORDING MEDIUM INCLUDING SYNCHRONIZATION DETECTING CIRCUIT

[75] Inventors: Hiroshi Suzuki, Monroeville, Pa.; Koji Osafune, Tokyo, Japan

[73] Assignee: Kabushiki Kaisha Toshiba, Kawasaki, Japan

[21] Appl. No.: 220,370

[22] Filed: Jul. 11, 1988

Related U.S. Application Data

[63] Continuation of Ser. No. 66,976, Jun. 29, 1987, abandoned.

[30] Foreign Application Priority Data

Jun. 30, 1986 [JP] Japan .................. 61-153532

[51] Int. Cl.$^4$ ............ G11B 27/22; G11B 15/02; G11B 20/16; G11B 5/09
[52] U.S. Cl. .......................... 360/51; 360/61
[58] Field of Search .............. 360/46, 66, 61, 51

[56] References Cited

U.S. PATENT DOCUMENTS 4,553,178 11/1985 Lynch .................. 360/46

FOREIGN PATENT DOCUMENTS 53-142386 5/1980 Japan .................. 360/66
61-80566 4/1986 Japan .

OTHER PUBLICATIONS

Imamura et al., "Barium Ferrite Perpendicular Recording Floppy Disk", Toshiba Review No. 154, Winter 1985, pp. 18–22.

Primary Examiner—Aristotelis M. Psitos
Assistant Examiner—Kevin J. Fournier
Attorney, Agent, or Firm—Foley & Lardner, Schwartz, Jeffery, Schwaab, Mack, Blumenthal & Evans

[57] ABSTRACT

A recording/reproducing system is provided with a PLL circuit for outputting data pulses and clock pulses on the basis of the read data reproduced from a magnetic recording medium. An external synchronization detection circuit is provided which detects the synchronization data (predetermined zero pattern data), recorded in synchronization areas of the magnetic recording medium, on the basis of the read data. When the synchronization data is detected, the synchronization detection circuit enables the PLL circuit to oscillate in synchronism with the read data. An internal synchronization detection circuit is provided, which detects the synchronization data (predetermined zero pattern data), as recorded in the synchronization areas of the magnetic recording medium, on the basis of data pulses derived from the PLL circuit and the clock pulses. A preventing circuit is further provided. When address mark data is not detected within a predetermined period of time after the external synchronization detection circuit detects th synchronization data, the preventing circuit prevents the PLL circuit from oscillating in synchronism with the read data.

21 Claims, 4 Drawing Sheets

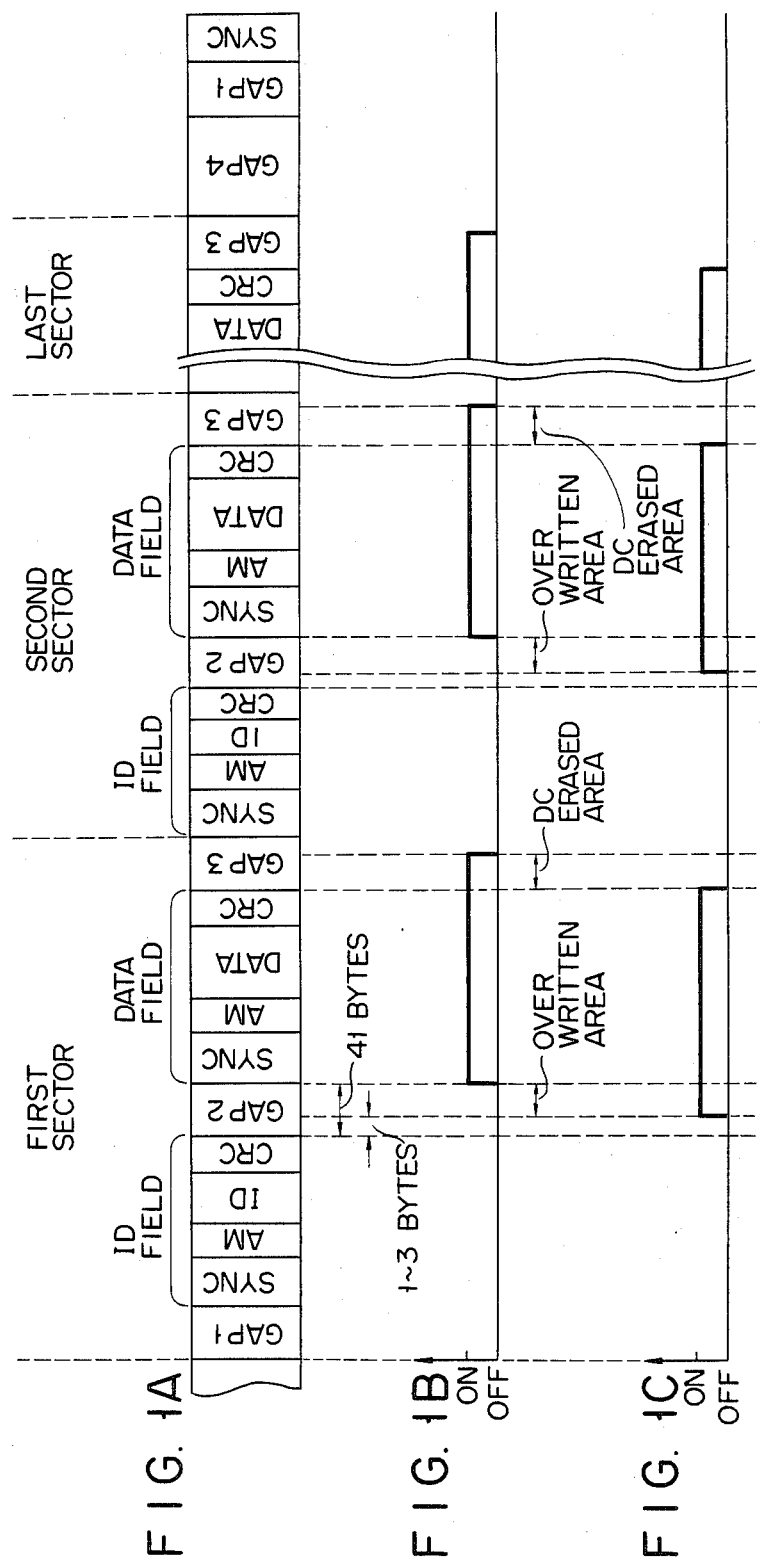

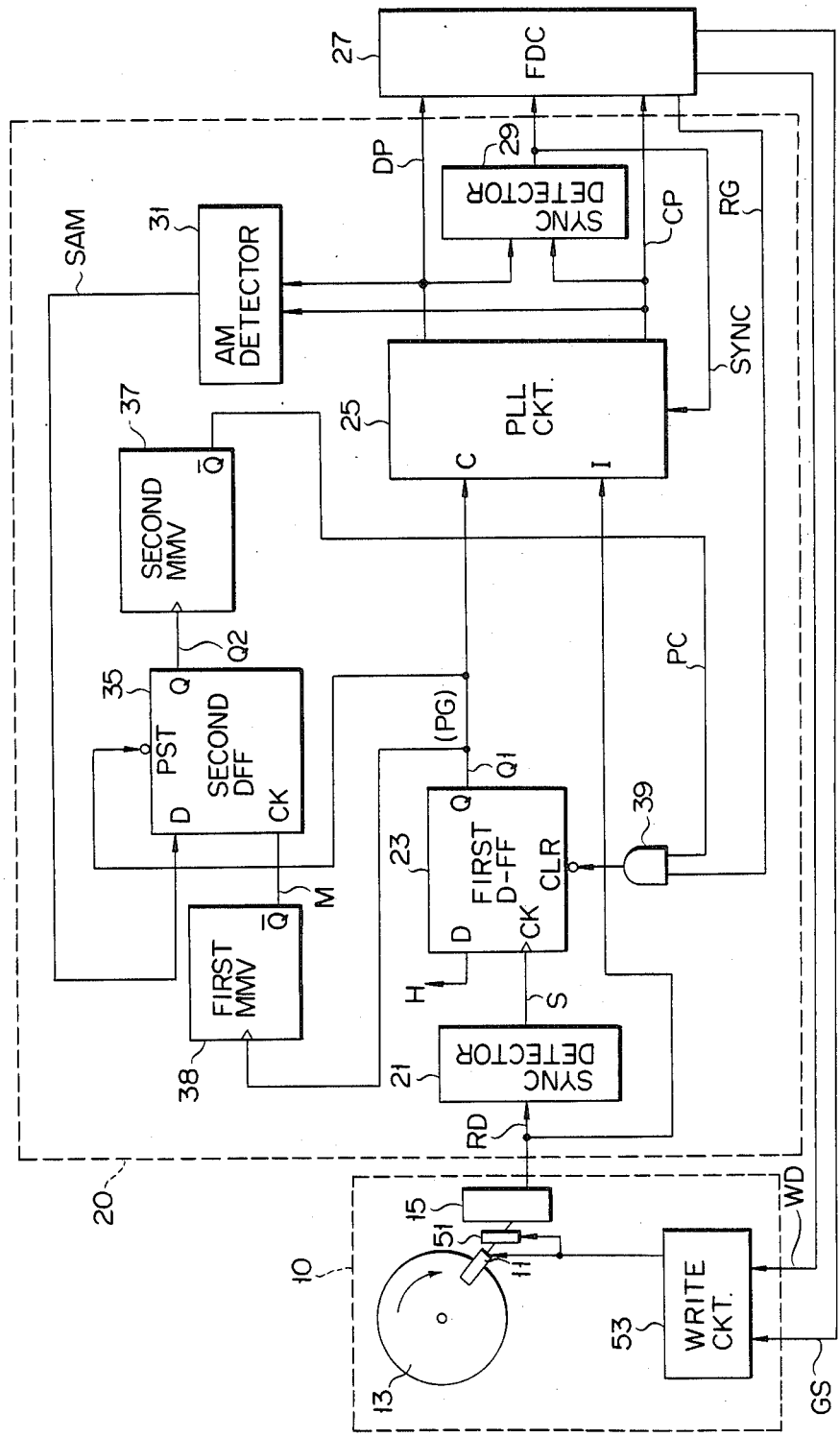
F I G. 2

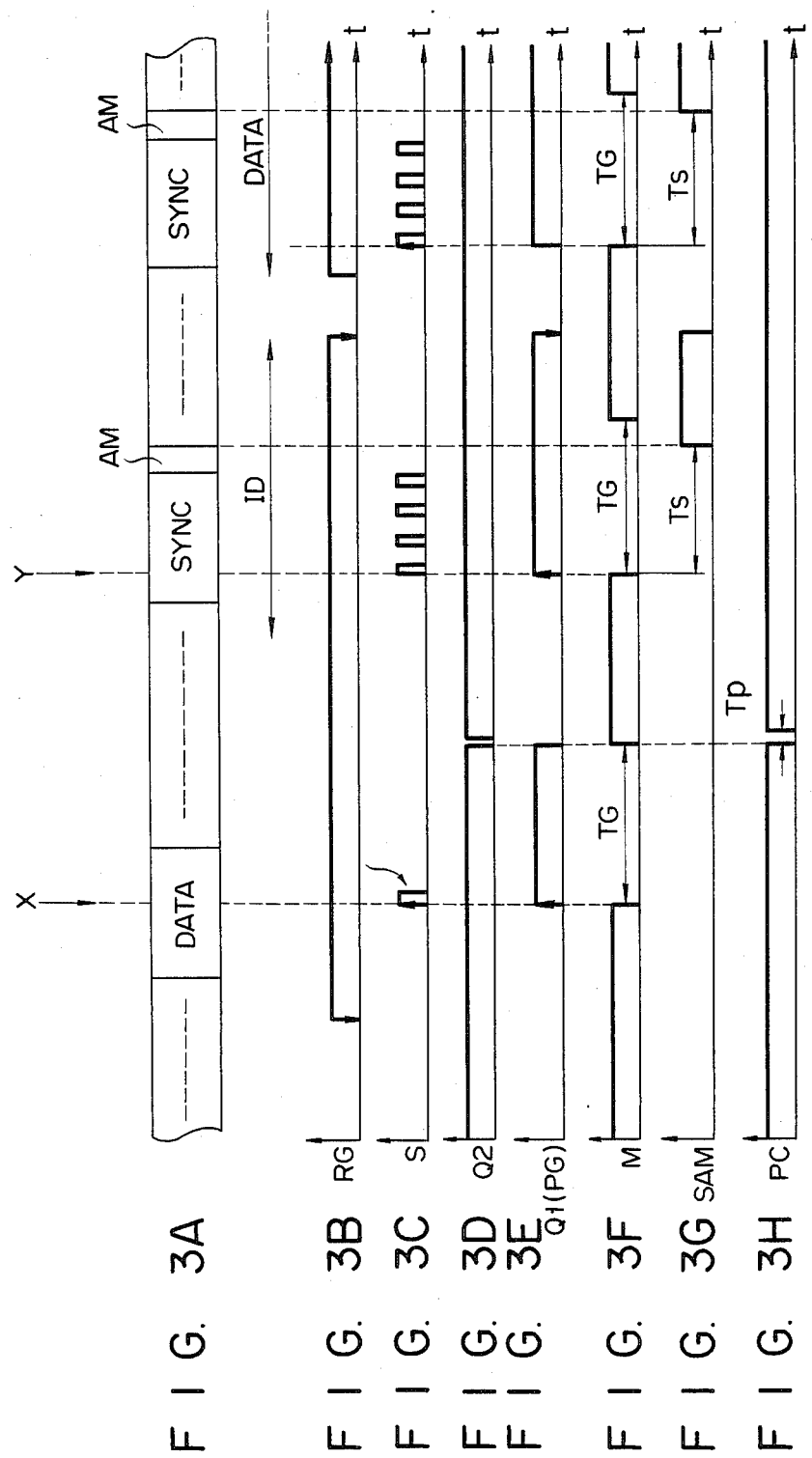

RECORDING/REPRODUCING SYSTEM FOR A MAGNETIC RECORDING MEDIUM INCLUDING SYNCHRONIZATION DETECTING CIRCUIT

This application is a continuation of application Ser. No. 066,976, filed June 29, 1987 and now abandoned.

BACKGROUND OF THE INVENTION

The present invention relates to a recording/reproducing system for a magnetic recording medium.

In the field of floppy disk apparatuses, a preceding-erase type magnetic head has recently been devised, which is suitable for use with a high-density magnetic recording medium (disk). In the preceding-erase type magnetic head, an erase head is located in front of a read/write head in the rotational direction of the medium. Before new data are recorded in the medium by the read/write head, previously-recorded data are first erased by the erase head. When this type of magnetic head is employed, the erase head should preferably be turned on at a predetermined time before the recording of data on the medium, by the read/write head, begins, and turned off at a predetermined time before the recording of data ends. However, to be able to perform such a control procedure requires a controller, for turning the heads on and off, which is complicated in its construction. The conventional controller is incapable of performing such a control procedure, and for this reason, the erase head and the read/write head are turned on or off simultaneously.

Normally, a track of a magnetic recording medium has a format shown in FIG. 1A, i.e., in which one sector comprises an ID field and a data field.

ID field comprises synchronization field area SYNC, address mark area AM, identification area ID, and cyclic redundancy check area CRC. Information representative of the starting position and address of a sector are recorded in the ID field.

The data field stores data, and comprises synchronization area SYNC, address mark area AM, data area DATA, and cyclic redundancy check area CRC.

synchronization area SYNC stores synchronization data for a PLL circuit;

address mark areas AM store address mark data indicative of the starting position of the ID field or the data field;

ID area ID stores data such as the cylinder number, the side number, the sector number, and the length of data field;

Data area DATA stores data read out or written in by a user; and cyclic redundancy check areas CRC store data for checking whether or not the data read out from the ID field or from data field contains an error.

Gaps 1, 2, 3, and 4 are areas for absorbing a fluctuation of rotation and an error in a mechanical alignment.

FIG. 1D shows a configuration of a preceding-erase type magnetic head. The magnetic head has an erase head, a read/write head and separator. The separator magnetically separates the erase head from read/write head. The erase head is located in front of the read/write head with respect to the rotational direction Z of a recording medium.

Read data reproduced from the recording medium by the magnetic head are supplied to a data separator which includes a PLL circuit and an external synchronization detecting circuit.

The external synchronization detector detects the synchronization data in the read data, and upon detection of the synchronization data, the PLL circuit begins oscillating in synchronism with the read data and outputs data pulses and clock pulses.

When the PLL circuit operates in synchronism with the read data, an internal synchronization detector detects the synchronization data, on the basis of the data pulse and the clock pulse, and a floppy disk controller checks whether or not the following data, other than synchronization data, are address mark data.

When the address mark data are detected, the floppy disk controller reads out the data stored in the ID area ID or in data area DATA on the basis of the data pulses and clock pulses. When data other than the address mark data are detected, the floppy disk controller stops operating for a predetermined time period, and then repeats the above-mentioned operation.

FIGS. 1B and 1C show the positions where the erase head and read/write head of the preceding-erase type magnetic head are turned on and off when data are written in the medium. As is shown in FIGS. 1A to 1C, DC erased areas are formed in Gap 3, where data are erased by the erase head and new data are not recorded.

In such a system, when data identical to the synchronization data are recorded in the data areas DATA, a problem arises in that the external synchronization detection circuit sometimes erroneously detects the synchronization area of the recording medium, with the result that the system may fail to read out the data from the data area. Specifically, when zero pattern data having a predetermined byte length is stored in the data area, the external synchronization detection circuit detects the zero pattern data as the synchronization data. In this case, the PLL circuit begins the synchronization operation. However, the internal synchronization detection circuit cannot detect the synchronization data, with the result that the PLL circuit continues to perform the synchronization operation. The PLL circuit oscillates at a frequency greatly different from the frequency of normal read data, due to irregular pulses derived from the DC erased area. Consequently, there is the possibility that the PLL circuit will be unable to read out even the normal data.

SUMMARY OF THE INVENTION

An object of the present invention is to provide a high reliability recording/reproducing system using a preceding-erase type magnetic head.

To achieve the above object, a recording/reproducing system is provided, which comprises a magnetic head of preceding-erase type, in contact with a flexible magnetic recording medium, for recording data on said magnetic recording medium and reading out data stored in said recording medium, said magnetic head having a read/write head for writing data on, and reading data from, said magnetic recording medium, and an erase head arranged in front of said read/write head for erasing data recorded on said magnetic recording medium, write means for turning said read/write head and said erase head on substantially simultaneously and for supplying a specified signal to said read/write head, thereby to erase data recorded on said magnetic recording medium, and to write data on said magnetic recording medium, digital signal-outputting means for outputting a digital signal corresponding to the data read out by said read/write head from said magnetic recording medium, PLL (Phase Locked Loop) circuit means for receiving the digital signal, and for oscillating in synchronism with the digital signal, thereby to output data pulses (DP) and clock pulses, readout means for receiving the data pulses and the clock pulses and reading out data from said magnetic recording medium in accordance with the data pulses and the clock pulses, external synchronization-detecting means for detecting synchronization data formed of predetermined pattern data, in accordance with the digital signal, and for enabling said PLL circuit means to oscillate in synchronism with the digital signal after the synchronization data has been detected, internal synchronization detecting means for detecting the synchronization data in accordance with the data pulses and the clock pulses output from said PLL circuit means, and preventing means for determining whether or not said external synchronization-detecting means has detected synchronization data reproduced from synchronization areas of said magnetic recording medium, and for preventing said PLL circuit means from oscillating in synchronism with said digital data when said external synchronization-detecting means has detected synchronization data reproduced from any areas other than synchronization areas of said magnetic recording medium.

With such an arrangement, the PLL circuit means (25) is prevented from taking a synchronizing action on the digital signal (RD). This preventing action is taken when address mark data is not detected within a predetermined period of time, after the external synchronization detect means (21, 23) detects the synchronization data, or the internal synchronization detect circuit does not (29) detects the synchronization data, after the external synchronization detect means (21, 23) detects the synchronization data. Therefore, even if the external synchronization detect means (21, 23) detects the data reproduced from the areas other than the synchronization areas of the tracks (49) of the recording medium (13), as the synchronization data, the address mark data or the internal synchronization data will not be detected, and hence the PLL circuit means (25) is prevented from taking a synchronizing action on the digital-signal (RD). For this reason, even if the magnetic head (11) of the preceding-erase type is used, and a DC erased area (Gap3) is provided succeeding to the data area, the PLL circuit means (25) is prevented from synchronizing with the irregularly periodic pulses, which are derived from the DC erased area (Gap3). This fact indicates that the data can reliably be read out from the recording medium (13). Further, the conventional floppy disk controller may be used without any modification.

BRIEF DESCRIPTION OF THE DRAWINGS

FIGS. 1A to 1C show the track format, the on/off timings of the erase head when the data field is recorded, in connection with the on/off timing of the read/write head;

FIG. 2 shows a block diagram illustrating a circuit configuration containing a magnetic floppy disk apparatus and a magnetic recording medium, which is an embodiment of this invention; and FIGS. 3A to 3H show timing charts illustrating the operation of the circuit configuration of FIG. 1.

DETAILED DESCRIPTION OF THE PREFERRED EMBODIMENTS

Figure 1D:
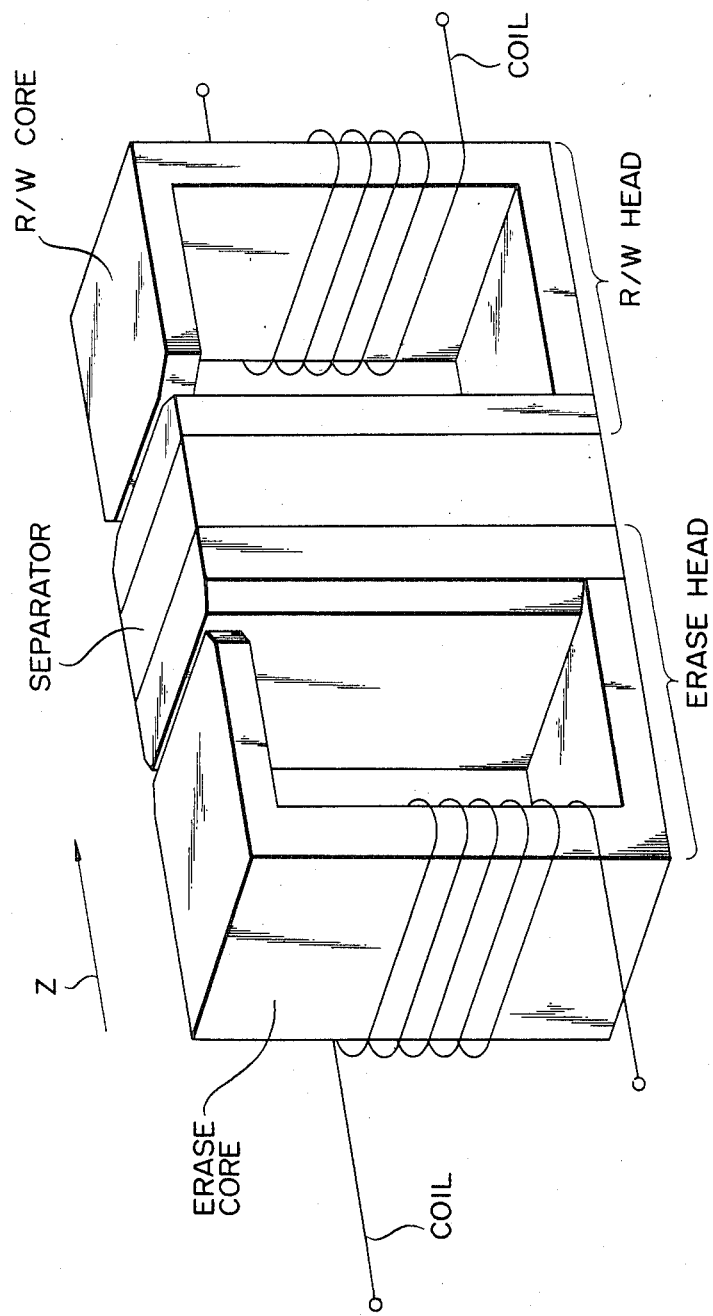
FIG. 1D shows a configuration of a preceding-erase type magnetic head.

A recording/reproducing system according to a first embodiment of this invention will be described, referring to the accompanying drawings. Its configuration will first be described.

A block diagram of this embodiment is shown in FIG. 2. Magnetic head 11 of floppy disk apparatus (FDP) 10 has an erase head and a read/write head same as FIG. 1D. FDC 27 receives write data WD from a host computer (not shown), and supplies write data WD to write circuit 53. FDC 27 also supplies gate signal GS to write circuit 53 and selector 51. Gate signal GS functions as a write gate signal, an erase gate signal and a select signal. The write gate signal and the erase gate signal are supplied to write circuit 53. The select signal is supplied to selector 51. Selector 51 supplies write signal to the read/write head when the select signal is H level. Selector 51 supplies output signal of the read/write head to pre-stage circuit 15 when the select signal is L level. Pre-stage circuit 15 is made up of an amplifier circuit, a time domain filter, and the like. Pre-stage circuit 15 amplifies the input signal, and converts it into a pulse signal.

The output signal from pre-stage circuit 15 is supplied to external synchronization detect circuit 21 of data separator circuit 20 as read data RD. External synchronization detect circuit 21 detects the synchronization areas of recording medium 13 on the basis of read data RD. In other words, external synchronization detect circuit 21 detects the synchronization data (zero pattern data) on the basis of read data RD. The output signal S of external synchronization detect circuit 21 is supplied to the clock terminal CK of first D-type flip-flop (first D FF) 23. The D terminal of first D FF 23 is connected to a H level. The output signal of AND gate 39 is supplied to the low active CLR terminal of first D FF 23. First D FF 23 latches the H level signal at the leading edge of the output signal S of external synchronization detect circuit 21. The Q output Q1 (PG) of first D FF 23 is supplied to the control terminal C of phase locked loop (PLL) circuit 25. The read data RD is supplied to the input terminal I of PLL circuit 25.

PLL circuit 25 is provided with a voltage controlled oscillator (not shown) in it, and operates so that the phase of the output pulses is equal to that of the input pulses. When the signal supplied to the control terminal C is at H level, PLL circuit 25 takes a synchronizing action on the read data RD, and separates the read data RD into data pulses DP and clock pulses CP (read operation). The data pulses DP are pulse signals representing the data as written into the data areas on the tracks of the recording medium 13. The clock pulses CP are pulse signals representing the timing for reading out data. PLL circuit 25, when the signal supplied to control terminal C is low in level, takes an action for synchronizing with the clock signal (at the write center frequency), which is contained in the PLL circuit per se. The data pulses DP and the clock pulses CP, which are output from PLL circuit 25, are supplied to floppy disk controller (FDC) 27. FDC 27 is connected to a host computer (not shown), and the like. FDC 27, as well known, receives a command from the host computer, and controls read gate signal RG, thereby to control read operation.

The data pulses DP and the clock pulses CP are also supplied to internal synchronization detect circuit 29.

Upon detect of the synchronization data, internal synchronization detect circuit 29 outputs H level signal SYNC on the basis of the data pulses DP and the clock pulses CP, which come from PLL circuit 25. The output signal from internal sync detect circuit 29 is supplied to FDC 27. FDC 27, when the signal SYNC is high, executes the read/write operation of data.

The data pulses DP and the clock pulses DP, which come from PLL circuit 25, are also supplied to address mark detect circuit 31. This circuit 31 detects fixed address mark data as stored in the address mark areas in the tracks on recording medium 13, on the basis of the data pulses DP and the clock pulses CP. The detect circuit 31, upon detect of the address mark data, outputs signal SAM at H level.

The output signal Q1 of first D FF 23 is supplied to the clock terminal CK of monostable multivibrator (one shot) (first MMV) 33. First MMV 33 produces a single pulse with a predetermined pulse width at the leading edge of signal Q1. The $\overline{Q}$ signal from first MMV 33 is supplied to the clock terminal CK of second D FF 35. The output signal SAM from address mark detect circuit 31 is supplied to the D terminal of second D FF 35. The output signal Q1 from first D FF 23 is supplied to the low active preset terminal PST of second D FF 35. The Q output of second D FF 35 is applied to the clock terminal CK of second MMV 37. This MMV applies a pulse signal PC to the input terminal of AND gate 39, in synchronism with the trailing edge of the output signal Q2. This pulse signal 39 continues the low level during the period TP. The other input terminal of AND gate 39 is supplied with read gate signal RG derived from FDC 27. The output signal from AND gate 39 is supplied to the low active clear terminal $\overline{CLR}$ of first D FF 23.

Each track of magnetic recording medium 13 of this embodiment, also has a format shown in FIG. 1A. When the data is recorded, positions on the track where the erase head is turned on and off, and positions on the track where the read/write head is turned on and off are shown in FIGS. 1B and 1C.

The operation of the first embodiment will be described referring to FIGS. 3A to 3H.

First, the recording operation will be described.

The host computer supplies a write command to FDC 27. In response to this command, FDC 27 causes gate signal GS to rise to H level. Gate signal GS functions as a write gate signal, an erase gate signal and a select signal. Write circuit 53 receives the write gate signal and the erase gate signal. When the write gate signal and the erase gate signal rise to H level, write circuit 53 generates a write signal and erase signal on the bases of write data WD supplied from the host computer via FDC 27 to write circuit 53. Write circuit 53 supplies the write signal to selector 51, and the erase signal to the erase head. When the select signal rises to H level, selector 51 supplies the write signal, which has been supplied from write circuit 53, to the read/write head.

By the above-mentioned operation, the data recorded on medium 13 is erased by the erase head, and new data is recorded on medium 13 by the read/write head.

Reproducing operation will now be described.

Description is applied for the case that the synchronization data from the synchronization area of track 49 is normally detected. Upon receipt of a read command from the host computer (not shown), FDC 27 causes gate signal GS fall to L level. When gate signal GS falls to L level, write circuit 53 stops generating the erase signal and the write signal. When the write signal is not supplied to the read/write head, read/write head reads the data recorded on medium 13, and outputs a signal corresponding to this data. When gate signal GS falls to L level, selector 51 supplies the output signal of the read/write head to pre-stage circuit 15. FDC 27 outputs a read gate signal RG in H level shown in FIG. 3B. FDP 10 receives the read gate signal RG at H level, and reads out the data as stored in the magnetic recording medium 13, and outputs the read data RD.

External synchronization detect circuit 21 detects the synchronization data stored in synchronization area (fixed zero pattern data) from read data RD, at time point Y in FIG. 3A. Then, the detect circuit 21 outputs the pulse signal S at H level shown in FIG. 3C (in this embodiment, four pulses) to clock terminal CK of first D FF 23. At this point, the output signal PC of second MMV 37 and the read gate signal RG are both at H level. The output signal of AND gate 39 is at H level, and first D FF 23 is released from its cleared state. First D FF 23 latches the H level signal at the leading edge of signal S, and supplies the operation permission signal PG in H level shown in FIG. 3E to the control terminal C of PLL circuit 25. Upon receipt of the H level signal PG, PLL circuit 25 starts the synchronizing operation with read data RG, and separates data pulses DP and clock pulses CP from read data RD before its outputting.

Internal synchronization detect circuit 29 detects the synchronization data on the basis of the data pulses DP and clock pulses CP from PLL circuit 25, and detect the synchronization data. Then, when the synchronization data is detected, it outputs the H level signal SYNC. When receiving the signal SYNC in H level, FDC 27 starts the read operation of data.

On the basis of data pulses DP and clock pulses CP from PLL circuit 25, address mark detect circuit 31 detects address mark data. Upon detection, address mark detect circuit 31 supplies H-level signal SAM to the D terminal of second D FF 35.

First MMV 33 outputs L-level negative pulse M, with the trigger of the leading edge of output signal Q1 of first D FF 33, as shown in FIG. 3E. The outputting of pulse M continues during the fixed time TG, as shown in FIG. 3F. In synchronism with the leading edge of pulse M, second D FF 35 latches H-level signal SAM from address mark detect circuit 31. Output signal Q2 of second D FF 35 keeps its H level, as shown in FIG. 3D. Accordingly, second MMV 37 keeps the outputting of H-level signal PC to AND gate 39. Read gate signal RG is also kept at H level, and AND gate 39 also keeps the outputting of an H-level signal. Therefore, first D FF 23 will never be cleared. Signal PG also keeps its H level, and PLL circuit 25 continues the synchronizing operation (read operation) for read data RD. FDC 27 continuously reads of the data in the ID filed, on the basis of data pulses DP and clock pulses CP.

After finishing to read the data in the ID field, FDC 27 renders read gate signal RG low in level. Upon receipt of the L-level read gate signal RG, first D FF 23 is cleared. PLL circuit 25 ceases the synchronizing operation for read data RD.

To read out data from the data field, FDC 27 again renders read gate signal low. External synchronization detect circuit 21 detects the synchronization data recorded in the synchronization area in the data field.

From that point on, the same operation as that for ID field reading is performed, and the data in the data field is read out. If the address mark is detected till time TG elapses after external synchronization detect circuit 21 has detected the synchronization data, PLL circuit 25 holds the read mode.

A case in which external synchronization detect circuit 21 detects synchronization data from an area other than the synchronization area in the tracks, will be described. For ease of understanding, it is assumed that at time point X, external synchronization detect circuit 21 detects the zero pattern data recorded in the data area as synchronization data. In this case, address mark detect circuit 31 does not detect address mark data within time TG after external synchronization detect circuit 21 detects the synchronization data. Output signal SAM of address mark detect circuit 31 remains low in level (FIG. 3G). At the leading edge of pulse M, second D FF 35 latches the L-level detect signal SAM, and outputs L-level signal Q2 (FIG. 3D). Triggered at the leading edge of signal Q2, second MMV 35 outputs negative pulse PC with pulse width TP to AND gate 39 (FIG. 3H). Upon receipt of the negative pulse PC, AND gate 39 outputs a negative pulse to the clear terminal $\overline{CLR}$ of first D FF 23. First D FF 23 is reset. By the reset of first D FF 23, operation permission signal PG becomes low in level, and PLL circuit 25 stops the synchronizing operation for read data RD. PLL circuit 25 performs the synchronizing operation for the predetermined clock in the PLL circuit 25. L-level signal PG is also supplied to the preset terminal $\overline{PST}$ of second D FF 35. Second D FF 35 is set. Signal Q2 becomes high in level again (FIG. 3D).

PLL circuit 25 is set in the read mode again when external synchronization detect circuit 21 detects the synchronization areas.

As described above, in this embodiment, if the address mark data is not detected within time TG after external synchronization detect circuit 21 detects the synchronization data, PLL circuit 25 interrupts the synchronizing operation for read data RD. (In this case, PLL circuit 25 performs the synchronizing operation for the center write frequency in the PLL circuit 25. It is not limited to this, however.) For this reason, even if external synchronization detect circuit 21 detects the synchronization data from the data areas and so on, PLL circuit 25 ceases the synchronizing operation for read data RD. This feature reliably prevents PLL circuit 25 from being synchronized with the irregularly periodical signal reproduced from the DC erased areas, even if the DC erased area is present subsequent to the data areas, and therefore from oscillating at the frequency widely different from the original frequency. As a result, according to the embodiment of the recording-/reproducing system, even when a magnetic head of the preceding-erase type is used, the data recorded in the magnetic recording medium is reliably reproduced.

In the above-mentioned embodiment, unless the address mark data is detected within a fixed period of time after the synchronization data is detected, the synchronizing operation of PLL circuit 25 for read data RD is stopped. This invention is not limited to this. As an alternative, for example, signal SYNC from internal synchronization detect circuit 29 may be supplied to the D input terminal of second D FF 35, with omission of address mark detect circuit 31 in the FIG. 2 circuit. In this second embodiment, even if zero pattern data is recorded in the data areas at the time point X, for example, in FIG. 3A, the zero pattern is not repeatedly detected, therefore, internal synchronization detect circuit 29 does not detect the synchronization data. Signal SYNC is left at L level. Second MMV 37 outputs a negative pulse PC, first D FF 23 is cleared, and operation permission signal PG is at L level. In other words, PLL circuit 25 starts synchronizing operation for read data RD, but stops the operation before it completes.

When the synchronization data is normally detected at time point Y, for example, in FIG. 3A, internal synchronization detect circuit 29 also detects the synchronization data, and outputs H-level signal SYNC. Second D FF 35 latches H-level signal SYNC. PLL circuit 25 continues the synchronizing operation to read data RD.

Additionally, the first embodiment for the address mark detection and the second embodiment detection may be combined.

As seen from the foregoing, according to this invention, even if the external synchronization detect circuit erroneously detects the synchronization areas on the tracks, the PLL circuit stops the synchronizing operation for read data RD unless the address mark or the internal synchronization is detected. To state it another way, even if the synchronization data is detected from areas other than the synchronization areas of the tracks, PLL circuit 25 stops the synchronizing operation for read data before it completes. Therefore, even if the magnetic head of the preceding-erase type is used, there never occurs the situation that, by the clock pulses with fluctuating periods derived from the DC erased areas of the tracks, the PLL circuit is locked at the oscillating frequency greatly shifted from the fundamental frequency, and it cannot perform the normal synchronizing operation. As a result, the data from the magnetic recording medium can be reliably read out. Furthermore, for an FDC, the known one-chip FDC may be used.

In the above embodiments, address mark detect circuit 31 detects the address mark on the basis of the output pulses DP and CP from the PLL circuit. As an alternative, the detection of the address mark may be based on the read data from FDP 10.

For the PLL circuit, the address mark detect circuit, and the synchronization detect circuit, the known circuits may be used. For example, for the address mark detect circuit, any detect circuit may be used, if it can detect predetermined pattern data (for example, missing cross) recorded in the address mark area. For the FDC, $\mu$DP7260 manufactured by NEC is known, which is a 1-chip controller containing a floppy disk controller and internal synchronization detect circuit. Any FDC with the performance comparable with that of this IC, may be used.

In the embodiments, FDC 27 is provided outside FDP 10 and data separator circuit 20 in FIG. 2. In practice, FDC 29 may be incorporated into FDD 10 and/or circuit 20.

Present invention can be applied to FDP having a tunnel erase head, a straddle erase head and so on. So, data can be correctly reproduced from a medium, on which the data has been written by the preceding-erase type magnetic head, by the FDP having the tunnel erase head or the straddle erase head.

What is claimed is:

1. A recording/reproducing system comprising:
   a magnetic head of preceding-erase type, in contact with a flexible magnetic recording medium, for recording data on said magnetic recording medium and reading out data stored in said recording medium, said magnetic head having a read/write head for writing data on, and reading data from, said magnetic recording medium, and an erase head arranged in front of said read/write head for erasing data recorded on said magnetic recording medium;

write means for turning said read/write head and said erase head on substantially simultaneously and for supplying a specified signal to said read/write head, thereby to erase data recorded on said magnetic recording medium, and to write data on said magnetic recording medium;

digital signal-outputting means for outputting a digital signal corresponding to the data read out by said read/write head from said magnetic recording medium;

PLL (Phase Locked Loop) circuit means for receiving the digital signal, and for oscillating in synchronism with the digital signal, thereby to output data pulses (DP) and clock pulses;

readout means for receiving the data pulses and the clock pulses and reading out data from said magnetic recording medium in accordance with the data pulses and the clock pulses;

external synchronization-detecting means for detecting synchronization data formed of predetermined pattern data, in accordance with the digital signal, and for enabling said PLL circuit means to oscillate in synchronism with the digital signal after the synchronization data has been detected;

internal synchronization detecting means for detecting the synchronization data in accordance with the data pulses and the clock pulses output from said PLL circuit means; and preventing means for determining whether or not said external synchronization-detecting means has detected synchronization data reproduced from synchronization areas of said magnetic recording medium, and for preventing said PLL circuit means from oscillating in synchronism with said digital data when said external synchronization-detecting means has detected synchronization data reproduced from any areas other than synchronization areas of said magnetic recording medium.

2. A system according to claim 1, wherein said preventing means detects said synchronization data and/or address mark data recorded in predetermined areas of said magnetic recording medium, on the basis of said data pulses and said clock pulses, and prevents said PLL circuit means from oscillating in synchronism with said digital signal when said synchronization data or address mark data is not detected within a fixed period of time after said external synchronization-detecting means detects said synchronization data.

3. A system according to claim 1, wherein said preventing means receives an output signal of said internal synchronization-detecting means, and prevents said PLL circuit means from oscillating in synchronism with said digital-signal when said internal synchronization-detecting means does not detect said synchronization data within a fixed period of time after said external synchronization-detecting means detects said synchronization data.

4. A system according to claim 1, wherein said preventing means includes address mark-detecting means connected to said PLL circuit means, for receiving said data pulses and said clock pulses, and to detect address mark data recorded in a predetermined area of said magnetic recording medium, and when said address mark-detecting means does not detect said address mark data within a fixed period of time after said external synchronization-detecting means detects said synchronization data, said preventing means prevents said PLL circuit means from oscillating in synchronism with said read data.

5. A system according to claim 1, wherein said PLL circuit means oscillates in synchronism with a predetermined reference clock when said preventing means prevents said PLL circuit means from oscillating in synchronism with said digital-signal.

6. A data separator system for reading out data recorded in a magnetic recording medium, said system comprising:

magnetic disk apparatus means having a preceding-erase type magnetic head which is in contact with a flexible magnetic recording medium, for reading out data from said recording medium, and for outputting read data which corresponds to data read out by said magnetic head;

phase-locked loop (PLL) circuit means for receiving said read data, for oscillating in synchronism with said read data, and for outputting data pulses and clock pulses;

external synchronization-detecting means for detecting synchronization data consisting of predetermined pattern data, on the basis of said read data, and for enabling said PLL circuit means to oscillate in synchronism with said read data, after the synchronization data is detected;

internal synchronization-detecting means for detecting said synchronization data on the basis of said data pulses and said clock pulses output from said PLL circuit means; and preventing means for detecting whether or not said external synchronization-detecting means has detected the synchronization data reproduced from synchronization areas of said magnetic recording medium, and preventing said PLL circuit means from oscillating in synchronism with said read data when said external synchronization-detecting means detects data, which is reproduced from areas other than said synchronization areas, as said synchronization data.

7. A data separator system according to claim 6, wherein said preventing means detects said synchronization data and/or address mark data recorded in predetermined areas of said magnetic recording medium, on the basis of said data pulses and said clock pulses, and prevents said PLL circuit means from oscillating in synchronism with said read data when said synchronization data or address mark data is not detected within a fixed period of time after said external synchronization-detecting means detects said synchronization data.

8. A data separator system according to claim 6, wherein said preventing means receives an output signal of said internal synchronization-detecting means, and prevents said PLL circuit means from oscillating in synchronism with said read data when said internal synchronization-detecting means does not detect said synchronization data within a fixed period of time after said external synchronization-detecting means detects said synchronization data.

9. A data separator system according to claim 6, wherein said preventing means includes address mark-detecting means connected to said PLL circuit means, for receiving said data pulses and said clock pulses, and to detect address mark data recorded in predetermined areas of said magnetic recording medium, and when said address mark-detecting means does not detect said address mark data within a fixed period of time after said external synchronization-detecting means detects said synchronization data, said preventing means prevents said PLL circuit means from oscillating in synchronism with said read data.

10. A system according to claim 6, wherein said PLL circuit means oscillates in synchronism with a predetermined reference clock when said preventing means prevents said PLL circuit means from oscillating in synchronism with said read data.

11. A recording/reproducing system for a rotating flexible magnetic recording medium having synchronization areas for recording synchronization data formed of first predetermined pattern data, comprising:
   signal read/write means for generating a read signal from said magnetic recording medium and recording a write signal on said magnetic medium;
   said signal read/write means including a magnetic head of preceding-erase type having a read/write head for recording said write signal on said magnetic recording medium and reproducing a signal corresponding to said read signal from said magnetic recording medium, and an erase head arranged on an upstream side of said read/write head, along the direction of rotation of said recording medium, for erasing a signal previously recorded on said magnetic recording medium prior to recording said write signal by said read/write head;
   PLL (Phase Locked Loop) circuit means receiving said read signal, for oscillating in synchronism with said read signal and generating data pulses and clock pulses from said read signal;
   PLL circuit enabling means for detecting said first predetermined pattern data in said read signal, and enabling said PLL circuit means to oscillate in synchronism with said read signal, in response to said detection of said first predetermined pattern data;
   preventing means for determining whether or not first predetermined pattern data detected by said PLL circuit enabling means is real synchronization data reproduced from said synchronization areas of said magnetic recording medium; and
   said preventing means preventing said PLL circuit means from oscillating in synchronism with said read signal when first predetermined pattern data detected by said PLL circuit enabling means is reproduced from any areas other than said synchronization areas.

12. A system according to claim 11, wherein said magnetic medium includes a mark area following each synchronization area, for recording second predetermined pattern data, and said preventing means detects said second predetermined pattern data reproduced from said mark area in a fixed period of time after said PLL circuit enabling means detects said first predetermined pattern data, to determine whether or not first predetermined pattern data detected by said PLL circuit enabling means is said synchronization data.

13. A system according to claim 12, wherein said preventing means includes mark pattern detecting means connected to said PLL circuit means and said PLL circuit enabling means, for receiving said data pulses and said clock pulses from said PLL circuit means to detect said second predetermined pattern data and inhibiting said PLL circuit enabling means from enabling said oscillating operation of PLL circuit means when said mark pattern detecting means does not receive said second predetermined pattern data in said fixed period of time.

14. A system according to claim 11, wherein said preventing means includes internal synchronization data detecting means for detecting synchronization data pulses representing said synchronization data, according to said data pulses and said clock pulses, in a fixed period of time after said PLL circuit enabling means detects said first predetermined pattern data, and said preventing means determines whether or not said first predetermined pattern data detected by said PLL circuit enabling means is said synchronization data when said internal synchronization data detecting means does not detect said synchronization data pulses in a fixed period of time.

15. A system according to claim 11, wherein said PLL circuit means oscillates in synchronism with a predetermined reference clock when said preventing means prevents said PLL circuit means from oscillation in synchronism with said read signal.

16. A system according to claim 11, wherein said signal read/write means includes means for supplying said read/write head with said write signal and supplying said erase head with an erase signal, to write said write signal on said magnetic recording medium while the previously recorded signals are erased by said erase head, so that erased areas, wherein the previously recorded signals are erased and no signals are recorded, remain on said magnetic recording medium.

17. A recording/reproducing system for a rotating flexible magnetic recording medium having synchronization areas for recording synchronization data formed of first predetermined pattern data, comprising:
   signal read/write means for generating a read signal from said magnetic recording medium and recording a write signal on said magnetic recording medium;
   said signal read/write means including a magnetic head of preceding-erase type having a read/write head for recording the write signal on and reproducing a signal corresponding to said read signal from said magnetic recording medium, and an erase head arranged on an upstream side of said read/write head, along the direction of rotation of said recording medium, for erasing a signal previously recorded on said magnetic recording medium prior to recording a write signal by said read/write head;
   read/write control means for supplying said signal read/write means with write data representing said write signal;
   said signal read/write means, according to said write data, supplying said read/write head with said write signal and supplying said erase head with an erase signal, to write said write signal on said magnetic recording medium while the previously recorded signals are erased by said erase head, so that erased areas, wherein the previously recorded signals are erased and no signals are recorded, remain on said magnetic recording medium;
   PLL (Phase Locked Loop) circuit means receiving said read signal, for oscillating in synchronism with said read signal and generating data pulses and clock pulses from said read signal;

said read/write control means receiving said data pulses and said clock pulses from said PLL circuit means and generating read data in accordance with said data pulses and said clock pulses;

PLL circuit enabling means for detecting said first predetermined pattern data in said read signal, and enabling said PLL circuit means to oscillate in synchronism with said read signal, in response to said detection of said first predetermined pattern data;

preventing means for determining whether or not said first predetermined pattern data detected by said PLL circuit enabling means is real synchronization data reproduced from said synchronization areas of said magnetic recording medium; and said preventing means preventing said PLL circuit means from oscillating in synchronism with said read signal when said first predetermined pattern data detected by said PLL circuit enabling means is reproduced from any areas other than said synchronization areas.

18. A system according to claim 17, wherein said magnetic medium includes a mark area following each synchronization area, for recording second predetermined pattern data, and said preventing means detects said second predetermined pattern data reproduced from said mark area in a fixed period of time after said PLL circuit enabling means detects said first predetermined pattern data, to determine whether or not said first predetermined pattern data detected by said PLL circuit enabling means is said synchronization data.

19. A system according to claim 18, wherein preventing means includes mark pattern detecting means connected to said PLL circuit means and said PLL circuit enabling means, for receiving said data pulses and said clock pulses from said PLL circuit means to detect said second predetermined pattern data and inhibiting said PLL circuit enabling means from enabling said oscillating operation of PLL circuit means when said mark pattern detecting means does not receive said second predetermined pattern data in said fixed period of time.

20. A system according to claim 17, wherein said preventing means includes internal synchronization data detecting means for detecting synchronization data pulses representing said synchronization data, according to said data pulses and said clock pulses, and said preventing means determines whether or not said first predetermined pattern data detected by said PLL circuit enabling means is said synchronization data when said internal synchronization data detecting means does not detect said synchronization data in a fixed period of time after said PLL circuit enabling means detects said first predetermined pattern data.

21. A system according to claim 17, wherein said PLL circuit means oscillates in synchronism with a predetermined reference clock when said preventing means prevents said PLL circuit means from oscillating in synchronism with said read signal.

* * * * *